(12) United States Patent
Abraham et al.

(10) Patent No.: US 8,350,755 B2
(45) Date of Patent: Jan. 8, 2013

(54) METHOD AND SYSTEM FOR PROPAGATING GNSS ASSISTANCE DATA AMONG COMMUNICATION DEVICES IN A GNSS GROUP

(75) Inventors: Charles Abraham, Los Gatos, CA (US); Mark Buer, Gilbert, AZ (US); David Garrett, Tustin, CA (US); Jeyhan Karaoguz, Irvine, CA (US); David Albert Lundgren, Mill Valley, CA (US); David Murray, Mission Viejo, CA (US)

(73) Assignee: Broadcom Corporation, Irvine, CA (US)

( * ) Notice: Subject to any disclaimer, the term of this patent is extended or adjusted under 35 U.S.C. 154(b) by 292 days.

(21) Appl. No.: 12/748,212

(22) Filed: Mar. 26, 2010

(65) Prior Publication Data

US 2011/0205110 A1    Aug. 25, 2011

Related U.S. Application Data

(60) Provisional application No. 61/306,387, filed on Feb. 19, 2010.

(51) Int. Cl.
  *G01S 19/05* (2010.01)
  *G01S 19/25* (2010.01)
(52) U.S. Cl. .............................. 342/357.42; 342/357.64
(58) Field of Classification Search ............. 342/357.64, 342/357.42
  See application file for complete search history.

(56) References Cited

U.S. PATENT DOCUMENTS

| | | | |
|---|---|---|---|
| 6,470,189 B1 * | 10/2002 | Hill et al. ....................... 455/517 |
| 7,149,534 B2 * | 12/2006 | Bloebaum et al. .......... 455/456.6 |
| 7,277,049 B2 * | 10/2007 | Korneluk et al. ......... 342/357.42 |
| 7,911,382 B2 * | 3/2011 | Liu et al. .................. 342/357.64 |
| 2003/0225893 A1 | 12/2003 | Roese et al. |
| 2007/0159388 A1 * | 7/2007 | Allison et al. ............ 342/357.09 |
| 2007/0225016 A1 * | 9/2007 | Jendbro et al. ............. 455/456.1 |
| 2008/0018527 A1 * | 1/2008 | LaMance et al. .......... 342/357.1 |
| 2009/0115657 A1 * | 5/2009 | Cheng et al. ............. 342/357.06 |
| 2010/0007553 A1 * | 1/2010 | Kim et al. ................. 342/357.09 |

\* cited by examiner

*Primary Examiner* — Gregory C Issing
(74) *Attorney, Agent, or Firm* — Sterne, Kessler, Goldstein & Fox, PLLC

(57) ABSTRACT

A communication device within a GNSS group propagates GNSS assistance data to one or more other communication devices in the GNSS group utilizing direct device-to-device connections. The GNSS assistance data comprises ephemeris received from one or more GNSS satellites and/or predicted ephemeris. As a source device, the communication device generates, and/or acquires from other resources such as a remote location server, the predicted ephemeris. As a destination device, the communication device receives existing GNSS assistance data from a source device and/or other communication devices in the GNSS group. A GNSS position for the communication device and corresponding time information are used to refresh the received GNSS assistance data. In instances where the communication device further acts as a relay device, the refreshed GNSS assistance data is relayed to other communication devices over wired and/or wireless direct device-to-device connections utilizing appropriate communication technologies such as WiFi, Bluetooth and/or Bluetooth low energy.

20 Claims, 5 Drawing Sheets

METHOD AND SYSTEM FOR PROPAGATING GNSS ASSISTANCE DATA AMONG COMMUNICATION DEVICES IN A GNSS GROUP

CROSS-REFERENCE TO RELATED APPLICATIONS/INCORPORATION BY REFERENCE

This patent application makes reference to, claims priority to and claims the benefit from U.S. Provisional Patent Application Ser. No. 61/306,387 filed on Feb. 19, 2010.

This patent application makes reference to:
U.S. Application Ser. No. 61/304,128 filed on Feb. 12, 2010,
U.S. Application Ser. No. 61/312,970 filed on Mar. 11, 2010,
U.S. Application Ser. No. 61/303,975 filed on Feb. 12, 2010,
U.S. application Ser. No. 12/748,159 filed on even date herewith,
U.S. application Ser. No. 12/732,973 filed on even date herewith,
U.S. application Ser. No. 12/748,039 filed on even date herewith, and
U.S. patent application Ser. No. 12/487,763 filed on Jun. 19, 2009.

Each of the above stated applications is hereby incorporated herein by reference in its entirety.

FIELD OF THE INVENTION

Certain embodiments of the invention relate to communication systems. More specifically, certain embodiments of the invention relate to a method and system for propagating GNSS assistance data among communication devices in a GNSS group.

BACKGROUND OF THE INVENTION

The Global Positioning System (GPS), the Global Navigation Satellite System (GLONASS), and the satellite navigation system GALILEO are three examples of Global Navigation Satellite Systems (GNSS). A GNSS utilizes an earth-orbiting constellation of a plurality of satellites each broadcasting signals which indicates its precise location and ranging information. From any location on or near the earth, GNSS receivers may normally determine their navigation information by acquiring the satellite signals broadcast from the plurality of GNSS satellites. The time to first fix (i.e. position computation) is enhanced when a GNSS receiver has prior access to a model of satellite orbits and clocks. This model is broadcast by GNSS satellites and is often referred to as ephemeris or ephemeris data. The ephemeris is broadcast to GNSS receivers as part of GNSS broadcasting signals or navigation messages. The broadcast ephemeris comprises navigational information of transmitting GNSS satellites. The navigational information may comprise standard satellite orbit models, clock model, and/or information about the operation status of the related GNSS satellites (healthy or unhealthy), which may be utilized for determining navigational information such as, for example, a position fix and a velocity of a GNSS receiver. The broadcast ephemeris is typically valid for a limited period of time such as 2 to 4 hours into the future (from the time of broadcast). Before the end of the period of validity, the GNSS receiver needs to obtain a fresh broadcast ephemeris to continue operating to produce an accurate position fix and/or velocity of the GNSS receiver.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for propagating GNSS assistance data among communication devices in a GNSS group, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for propagating GNSS assistance data among communication devices in a GNSS group. In various embodiments of the invention, a communication device within a GNSS group may be operable to propagate or distribute GNSS assistance data to one or more other communication devices in the GNSS group utilizing corresponding direct device-to-device connections that are established directly between the communication device and the one or more other communication devices. The GNSS assistance data comprises ephemeris received from one or more GNSS satellites and/or predicted ephemeris. The communication device may function as a source device or a destination device in the GNSS group. A source device is referred to as a communication device that provides GNSS assistance data to one or more other devices in the GNSS group. In an embodiment where a destination device acts as a relay device to one or more other devices, the GNSS group may be referred to as a GNSS spreading group. In this embodiment, a relay device is a communication device that forwards or relays the GNSS assistance data to one or more other communication devices in the GNSS spreading group. A GNSS spreading group comprises at least one source device, at least one relay device and one or more other communication devices. In instances where the communication device plays a role as a source device, the predicted ephemeris in the GNSS assistance data may be generated or created by the communication device, or may be acquired from other resources such as a remote location server. In instances where the communication device is a destination device or a relay device, the communication device may be operable to receive the GNSS assistance data from a source device and/or other relay devices in the GNSS spreading group. A GNSS position may be calculated for the communication device utilizing the GNSS assistance data. The GNSS assistance data may be refreshed by adding the calculated GNSS position for the communication device and corresponding time information. The refreshed GNSS assistance data may be communicated to two or more other communication devices within the GNSS spreading group over corresponding direct device-to-device connections. Both wired and wireless direct device-to-device connections may be utilized for spreading the GNSS assistance data within the GNSS spreading group. Depending on device capabilities such as specific radios supported, different communication technologies such as Bluetooth, Bluetooth low energy and/or WiFi may be utilized by the corresponding direct device-to-device connections.

Figure 1:
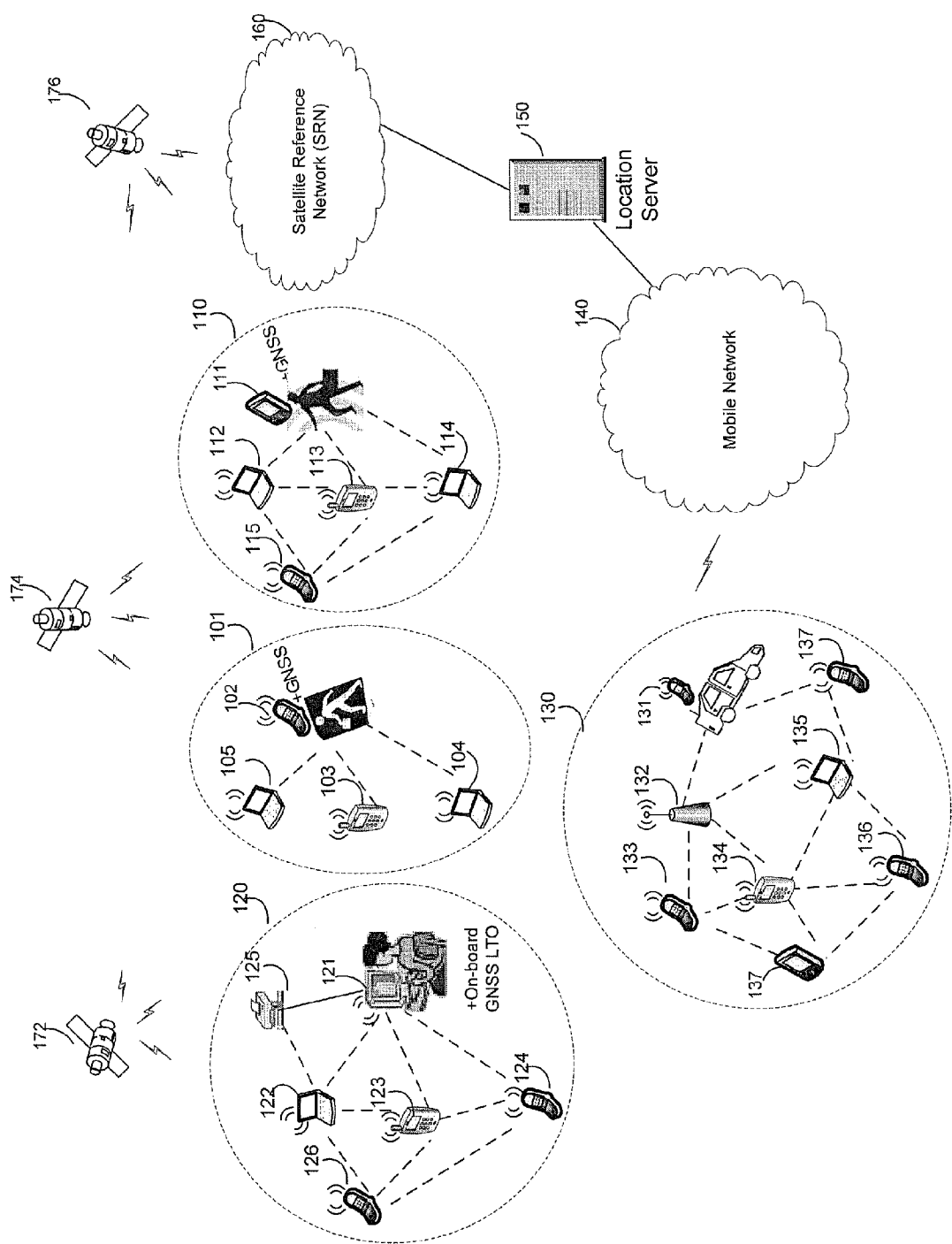
FIG. 1 is a diagram illustrating an exemplary communication system that is operable to propagate GNSS assistance data from device to device in a GNSS group, in accordance with an embodiment of the invention.

FIG. 1 is a diagram illustrating an exemplary communication system that is operable to propagate GNSS assistance data from device to device in a GNSS group, in accordance with an embodiment of the invention. Referring to FIG. 1, there is shown a communication system 100. The communication system 100 comprises a plurality of GNSS groups, of which GNSS groups 101-130 are illustrated, a mobile network 140, a location server 150, a satellite reference network (SRN) 160 and a plurality of GNSS satellites, of which GNSS satellites 162-166 are displayed.

A GNSS group may comprise a plurality of communication devices such as, for example, multi-radio mobile devices, routers and/or access points. Communication devices in a GNSS group may be operable to communicate, for example, GNSS related information over direct device-to-device links or connections. In this regard, information such as GNSS assistance data may be propagated or disseminated within the GNSS group directly from device to device.

A communication device in a GNSS group may function as a source device or a destination device. A communication device that may be operable to provide GNSS assistance data to the GNSS group is referred to as a source device. A communication device that may be operable to receive existing GNSS assistance data in the GNSS group is referred to as a destination device. In instances where a destination device is also operable to forward or relay received existing GNSS assistance data to one or more other communication devices in the GNSS group, the destination device is referred as a relay device. A relay device is a destination device, but a destination device may not necessarily be a relay device. In instances where a GNSS group comprises at least one relay device, the GNSS group may be referred to as a GNSS spreading group. A GNSS spreading group is a GNSS group, but a GNSS group may not necessarily be a GNSS spreading group. For example, communication devices 103-105 in the GNSS group 101 may be operable to receive GNSS assistance data from the source device 101. The received GNS assistance data may not further be forwarded to other communication devices. In this regard, the communication devices 103-105 function as destination devices only. Communication devices 122-125 in the GNSS group 120 may be operable to receive GNSS assistance data from the source device 121. The communication devices 122-125 may further act as relay devices to forward or relay the received GNSS assistance data to other communication devices such as the communication device 126. The communication devices 122-125 are relay devices and the GNSS group 120 is a GNSS spreading group.

Direct device-to-device connections, which may be wired or wireless, may be utilized for propagating GNSS assistance data within a GNSS group such as the GNSS group 110. Depending on device capabilities, different communication technologies such as, for example, Bluetooth, Bluetooth low energy and/or WiFi, may be utilized for distributing GNS assistance data within the GNSS group 110 directly from device to device.

A source device may comprise suitable logic, circuitry, interfaces and/or code that are operable to create or calculate GNSS assistance data on its own and/or may acquire GNSS assistance data from other resources such as the location server 150 depending on device capabilities. For example, in instances where a source device such as a source device 111 in the GNSS group 110 is GNSS capable, the source device 111 may be operable to receive GNSS satellite signals from visible GNSS satellites such as the GNSS satellites 172-176. The source device 111 may be operable to extract ephemeris or ephemeris data of corresponding broadcasting GNSS satellites from the received GNSS signals. The extracted ephemeris may be utilized to calculate navigation information such as a velocity and/or a GNSS position for the source device 111. The extracted ephemeris, the calculated GNSS position of the source device 111 and corresponding time information may be utilized to form GNSS assistance data at the source device 111.

In instances where a source device such as the source device 121 in the GNSS group 120 is on-board GNSS Long Term Orbit (LTO) capable, in this regard, the source device 121 may be operable to generate or calculate predicted ephemeris, namely, GNSS LTO data, utilizing ephemeris extracted from received GNSS signals. A GNSS position for the source device 121 may be calculated utilizing the extracted ephemeris from the received GNSS signals. The generated GNSS LTO data, the calculated GNSS position for the source device 111 and corresponding time information may be utilized to form GNSS assistance data at the source device 121.

In instances where a source device such as a source device 131 in the GNSS group 130 has access to other GNSS assistance data resources such as the location server 150, the source device 131 may be operable to acquire ephemeris or predicted ephemeris from the location server 150. The acquired ephemeris or predicted ephemeris may be utilized to calculate a GNSS position for the source device 131. The acquired ephemeris or predicted ephemeris together with the calculated GNSS position of the source device 131 and corresponding time information may be utilized to form GNSS assistance data at the source device 131. GNSS assistance data at a source device may be spread or propagated to one or more destination devices and/or relay devices over direct device-to-device connections.

A relay device may comprise suitable logic, circuitry, interfaces and/or code that are operable to relay or forward existing GNSS assistance data such as ephemeris in an associated GNSS spreading group. A relay device may be operable to deliver existing GNSS assistance data over direct device-to-device connections to one or more other communication devices in the GNSS spreading group. For example, in instances where the communication device 112 acts as a relay device in the GNSS group 110, the communication device 112 may be operable to receive GNSS assistance data from the source device 111. The received GNSS assistance data comprises ephemeris, the GNSS position of the source device 111 and/or corresponding time information. The communication device 112 may be operable to utilize the received GNSS assistance data to calculate its own GNSS position. The GNSS position of the source device 111 in the received GNSS assistance data may be utilized as a reference position by the communication device 112 in order to get a fast position fix. The communication device 112 may be operable to refresh the received GNSS assistance data by adding its own calculated GNSS position and corresponding time information. The resulting GNSS assistance data may be forwarded or relayed to one or more adjacent communication devices such as the communication devices 113-115 over direct device-to-device connections.

Depending on device capabilities, various communication technologies may be utilized over the direct device-to-device connections. For example, in instances where the communication device 112 acts as a relay device in the GNSS group 110 and is a Bluetooth low energy enabled mobile device, the communication device 112 may be operable to forward or relay GNSS assistance data over a Bluetooth low energy connection between the communication device 112 and an intended Bluetooth low energy enabled communication device. In instances where a relay device such as the communication device 132 is a WiFi access point, the communication device 132 may be operable to forward or relay GNSS assistance data over WiFi connections to a plurality of associated WiFi capable communication devices.

The mobile network 140 may comprise suitable logic, circuitry, interfaces and/or code that are operable to interface various access networks such as, for example, a CDMA network, a UMTS network, a LTE network and/or a WiMAX network, with external data networks such as packet data networks (PDNs). The mobile network 140 may be configured to communicate various data services such as location-based services to associated communication devices such as, for example, communication devices in the GNSS groups 101-130. The mobile network 140 may be operable to communicate with the location server 150 for location related information such as GNSS assistance data to provide to users to enhance location-based services.

The location server 150 may comprise suitable logic, circuitry, interfaces and/or code that are operable to access the satellite reference network (SRN) 160 to collect GNSS satellite data by tracking GNSS constellations through the SRN 160. The location server 150 may be operable to utilize the collected GNSS satellite data to generate GNSS assistance data comprising, for example, ephemeris and/or predicted ephemeris (GNSS LTO data) of broadcasting GNSS satellites, for associated users. In instances where the location server 150 receives requests for GNSS assistance data from users such as, for example, the source device 131 in the GNSS group 130, the location server 150 may be operable to provide the generated GNSS assistance data to the source device 131 over the mobile network 140. The communicated GNSS assistance data may be propagated directly from device to device within the GNSS group 130.

The SRN 160 may comprise suitable logic, circuitry, interfaces and/or code that are operable to collect and/or distribute data for GNSS satellites on a continuous basis. The SRN 160 may comprise a plurality of GNSS reference tracking stations located around the world to provide assistant GNSS (A-GNSS) coverage all the time in both a home network and/or any visited network.

The GNSS satellites 172 through 176 may comprise suitable logic, circuitry, interfaces and/or code that may be operable to generate and broadcast satellite navigational information such as ephemeris. The broadcast satellite navigational information may be collected by the SRN 160 to be utilized by the location server 150 to enhance LBS services. The GNSS satellites 172 through 176 may comprise GPS, Galileo, and/or GLONASS satellites.

In an exemplary operation, a source device may be operable to generate on its own and/or acquire GNSS assistance data from other resources such as the location server 150 for an associated GNSS group. The resulting GNSS assistance data comprises ephemeris and/or predicted ephemeris of broadcasting GNSS satellites, and other location related information such as reference locations and corresponding time information. The GNSS assistance data may be propagated within the GNSS group over direct device-to-device connections or links. In this regard, the GNSS assistance data may be enhanced or refreshed at each encountered destination or relay device within the GNSS group by adding GNSS positions of destination or relay devices and corresponding time information. Depending on device capabilities, the GNSS assistance data may be distributed within the GNSS group directly from device to device utilizing various communication technologies such as, for example, Bluetooth, Bluetooth low energy and/or WiFi.

Figure 2:
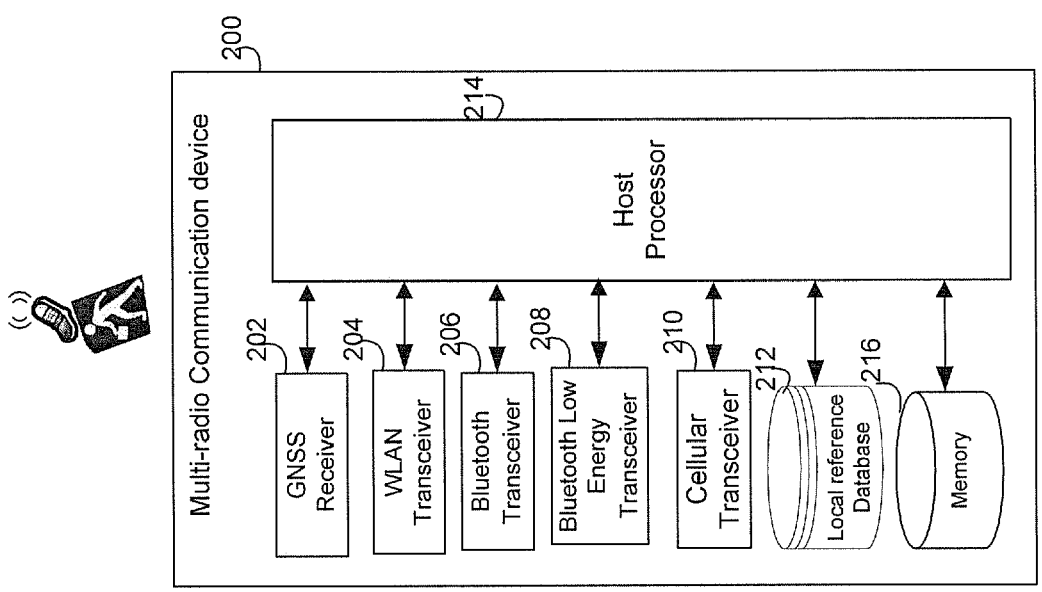
FIG. 2 is a block diagram illustrating an exemplary multi-radio mobile device that is operable to propagate GNSS assistance data from device to device in a GNSS group, in accordance with an embodiment of the invention.

FIG. 2 is a block diagram illustrating an exemplary multi-radio mobile device that is operable to propagate GNSS assistance data from device to device in a GNSS group, in accordance with an embodiment of the invention. Referring to FIG. 2, there is shown a multi-radio communication device 200. The multi-radio communication device 200 comprises a GNSS receiver 202, a WLAN transceiver 204, a Bluetooth transceiver 206, a Bluetooth low energy transceiver 208, a cellular transceiver 210, a local reference database 212, a host processor 214 and a memory 216.

The GNSS receiver 202 may comprise suitable logic, circuitry, interfaces and/or code that may be operable to detect and receive GNSS signals from a plurality of visible GNSS satellites such as the GNSS satellite 172-176. The GNSS receiver 202 may be operable to extract GNSS satellite navigation information such as ephemeris of broadcasting GNSS satellites from the received GNSS signals. The extracted ephemeris may be communicated to the host processor 214 for further processing. In some embodiments of the invention, the GNSS receiver 202 may be an optional component unit for the multi-radio communication device 200.

The WLAN transceiver 204 may comprise suitable logic, circuitry, interfaces and/or code that may be operable to receive and/or transmit radio frequency signals using wireless LAN technology. In this regard, the radio frequency signals may comprise GNSS assistance data with ephemeris, predicted ephemeris, and/or reference positions and corresponding time information. The WLAN transceiver 204 may be operable to communicate GNSS assistance data with intended WLAN capable communication devices over WLAN connections.

The Bluetooth transceiver 206 may comprise suitable logic, circuitry, interfaces and/or code that may be operable to receive and/or transmit radio frequency signals using Bluetooth technology. In this regard, the radio frequency signals may comprise GNSS assistance data with ephemeris, predicted ephemeris, and/or reference positions and corresponding time information. The Bluetooth transceiver 206 may be operable to communicate GNSS assistance data with intended Bluetooth capable communication devices over Bluetooth connections.

The Bluetooth low energy transceiver 208 may comprise suitable logic, circuitry, interfaces and/or code that may be operable to receive and/or transmit radio frequency signals using Bluetooth low energy technology. In this regard, the radio frequency signals may comprise GNSS assistance data with ephemeris, predicted ephemeris, and/or reference positions and corresponding time information. The Bluetooth low energy transceiver 208 may be operable to communicate GNSS assistance data with intended Bluetooth low energy capable communication devices over Bluetooth low energy connections.

The cellular transceiver 210 may comprise suitable logic, circuitry, interfaces and/or code that may be operable to receive and/or transmit radio frequency signals using various cellular communication technologies such as, for example, CDMA, GSM, UMTS and/or LTE. The cellular transceiver 210 may be operable to communicate information such as, for example, GNSS assistance data with intended cellular communication devices over cellular connections. The GNSS assistance data may comprise ephemeris, predicted ephemeris, and/or reference positions and corresponding time information.

The local reference database 212 may comprise suitable logic, circuitry, interfaces and/or code that may be operable to manage and store data comprising GNSS assistance data such as ephemeris, predicted ephemeris, and/or reference locations and corresponding time information. In instances where the multi-radio communication device 200 plays a role as a source device in an associated GNSS group, the stored GNSS assistance data in the local reference database 212 may be created by the multi-radio communication device 200 or may be acquired from other resources such as the location server 150 depending on device capabilities.

In instances where the multi-radio communication device 200 plays a role as a destination device and/or a relay device in an associated GNSS group, the stored GNSS assistance data in the local reference database 212 may be received by the multi-radio communication device 200 from a source device and/or other relay devices in the associated GNSS group.

The host processor 214 may comprise suitable logic, circuitry, interfaces and/or code that may be operable to manage and/or control operations of associated device component units such as, for example, the GNSS receiver 202, the WLAN transceiver 204, the Bluetooth transceiver 206, the Bluetooth low energy transceiver 208, and/or the cellular transceiver 210, depending on corresponding usages. For example, the host processor 214 may be operable to activate or deactivate one or more associated radios such as the GNSS receiver 202 on an as needed basis to save power. The host processor 214 may be operable to coordinate operations among associated device component units for various applications. For example, the host processor 214 may be operable to utilize GNSS satellite navigation information such as ephemeris received from the GNSS receiver 202 to calculate a GNSS position for the multi-radio communication device 200 when needed. In instances where the multi-radio communication device 200 is GNSS LTO capable, the host processor 214 may be operable to calculate predicted ephemeris, which may be good for 7 days in the future, for example, for the received ephemeris.

In instances where the multi-radio communication device 200 plays a role as a source device in an associated GNSS group, the host processor 214 may be configured to generate GNSS assistance data utilizing the received ephemeris from the GNSS receiver 202, the calculated predicted ephemeris, the calculated GNSS position and corresponding time information. The host processor 214 may also be operable to acquire GNSS assistance data from other resources such as the location server 150 over associated radios such as, for example, the cellular transceiver 210. The host processor 214 may be operable to communicate the resulting GNSS assistance data to one or more destination devices and/or relay devices in the GNSS group over direct device-to-device connections or links.

In instances where the multi-radio communication device 200 plays a role as a destination device in an associated GNSS group, the host processor 214 may be operable to receive GNSS assistance data from a source device and/or other relay devices in the GNSS group. A GNSS position may be calculated for the multi-radio communication device 200 utilizing the received GNSS assistance data. The host processor 214 may be operable to utilize the calculated GNSS position to support particular LBS applications. Furthermore, in instances where the multi-radio communication device 200 plays a role as a relay device in an associated GNSS group, the host processor 214 may be operable to refresh the received GNSS assistance data by adding the calculated GNSS position and corresponding time information. The refreshed GNSS assistance data may be forwarded or replayed to other destination devices and/or relay devices in the GNSS group over direct device-to-device connections or links.

The memory 216 may comprise suitable logic, circuitry, interfaces and/or code that may be operable to store information such as executable instructions and data that may be utilized by the host processor 214 and/or other associated component units such as, for example, the GNSS receiver 202 and/or the WLAN transceiver 204. The memory 216 may comprise RAM, ROM, low latency nonvolatile memory such as flash memory and/or other suitable electronic data storage.

In an exemplary operation, the host processor 214 may be operable to coordinate operations of associated device component units such as, for example, the GNSS receiver 202 and the WLAN transceiver 204 depending on corresponding usages. For example, the host processor 214 may be operable to receive GNSS satellite navigation information such as ephemeris of corresponding broadcasting GNSS satellites from the GNSS receiver 202. A GNSS position may be calculated for the multi-radio communication device 200 utilizing the received ephemeris. Predicted ephemeris may be calculated when the multi-radio communication device 200 is GNSS LTO capable.

In instances where the multi-radio communication device 200 is a source device in an associated GNSS spreading group, GNSS assistance data at the multi-radio communication device 200 may be generated utilizing the received ephemeris from the GNSS receiver 202, the received ephemeris, the calculated predicted ephemeris, the calculated GNSS position and corresponding time information. The multi-radio communication device 200 may also be operable to acquire GNSS assistance data from other resources such as the location server 150 over, for example, the cellular transceiver 210. The resulting GNSS assistance data may be communicated to one or more destination devices and/or relay devices in the GNSS group over direct device-to-device connections or links.

In instances where the multi-radio communication device 200 is a destination device in an associated GNSS group, the host processor 214 may be operable to receive GNSS assistance data from a source device and/or other relay devices in the GNSS group over, for example, the WLAN transceiver 204, the Bluetooth transceiver 206 and/or the Bluetooth low energy transceiver 208. A GNSS position may be calculated for the multi-radio communication device 200 according to the received GNSS assistance data to support LBS applications. In addition, in instances where the multi-radio communication device 200 also plays a role as a relay device in the associated GNSS group, the received GNSS assistance data may be refreshed or updated by adding the calculated GNSS position and corresponding time information. The refreshed GNSS assistance data may be forwarded or relayed to other destination devices and/or relay devices in the GNSS group over direct device-to-device connections or links when needed.

Figure 3:
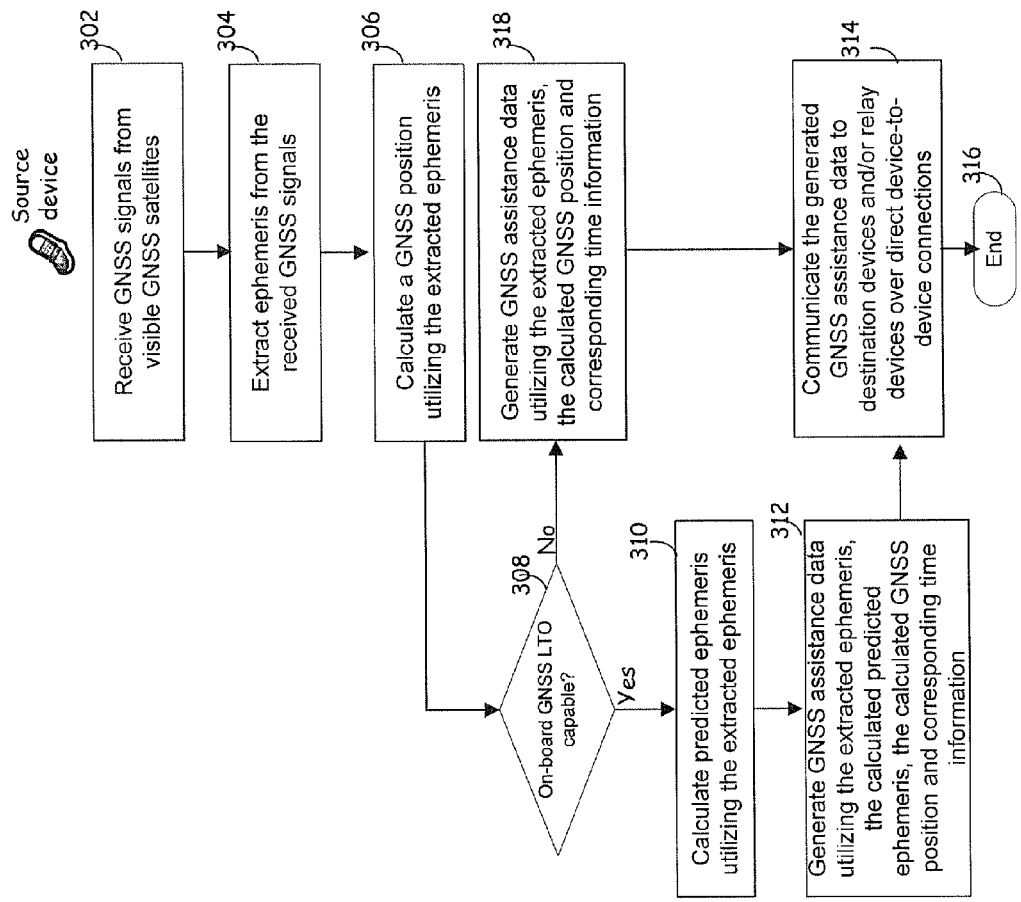
FIG. 3 is a flow chart illustrating exemplary steps utilized by a GNSS capable source device to provide GNSS assistance data to a GNSS group, in accordance with an embodiment of the invention.

FIG. 3 is a flow chart illustrating exemplary steps utilized by a GNSS capable source device to provide GNSS assistance data to a GNSS group, in accordance with an embodiment of the invention. Referring to FIG. 3, the exemplary steps may start with step 302. In step 302, the multi-radio communication device 200 may be operable to receive GNSS signals over the GNSS receiver 202 from visible GNSS satellites such as the GNSS satellites 172-176. In step 304, GNSS satellite navigation information such as ephemeris may be extracted from the received GNSS signals. In step 306, the host processor 214 may be operable to calculate a GNSS position for the multi-radio communication device 200 utilizing the extracted ephemeris. In step 308, it may be determined whether the multi-radio communication device 200 is GNSS LTO capable. In instances where the multi-radio communication device 200 is GNSS LTO capable, then in step 310, the multi-radio communication device 200 may be operable to calculate predicted ephemeris good for 2-7 days in the future, for example, utilizing the extracted ephemeris. In step 312, the multi-radio communication device 200 may be operable to generate GNSS assistance data utilizing the extracted ephemeris, the calculated predicted ephemeris, the calculated GNSS position and corresponding time information. In step 314, the generated GNSS assistance data may be communicated to one or more destination devices and/or relay devices within an associated GNSS group over direct device-to-device connections. The exemplary steps may end in step 316.

In step 308, in instances where the multi-radio communication device 200 is not GNSS LTO capable, then in step 318, the multi-radio communication device 200 may be operable to generate GNSS assistance data utilizing the extracted ephemeris, the calculated GNSS position and corresponding time information. The exemplary steps may continue in step 314.

Figure 4:
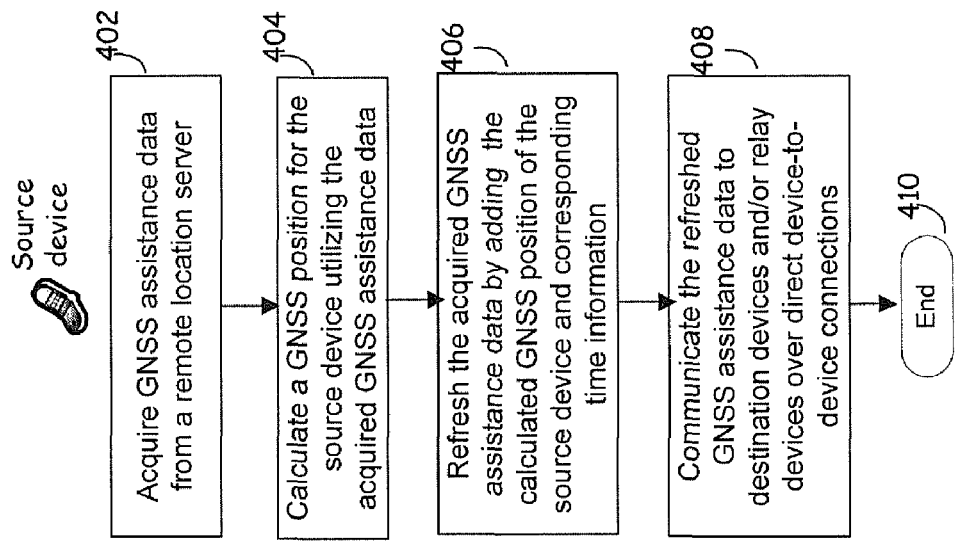
FIG. 4 is a flow chart illustrating exemplary steps utilized by a source device to acquire GNSS assistance data from a remote location server for a GNSS group, in accordance with an embodiment of the invention.

FIG. 4 is a flow chart illustrating exemplary steps utilized by a source device to acquire GNSS assistance data from a remote location server for a GNSS group, in accordance with an embodiment of the invention. Referring to FIG. 4, the exemplary steps may start with step 402. In step 402, the multi-radio communication device 200 is operable to acquire GNSS assistance data from a remote location server such as the location server 150. In step 404, a GNSS position for the multi-radio communication device 200, acting as a source device, may be calculated utilizing the acquired GNSS assistance data. In step 406, the acquired GNSS assistance data may be refreshed by adding the calculated GNSS position of the multi-radio communication device 200 and corresponding time information. In step 408, the refreshed GNSS assistance data may be communicated to destination devices and/or relay devices over direct device-to-device connections. The exemplary steps may end in step 410.

Figure 5:
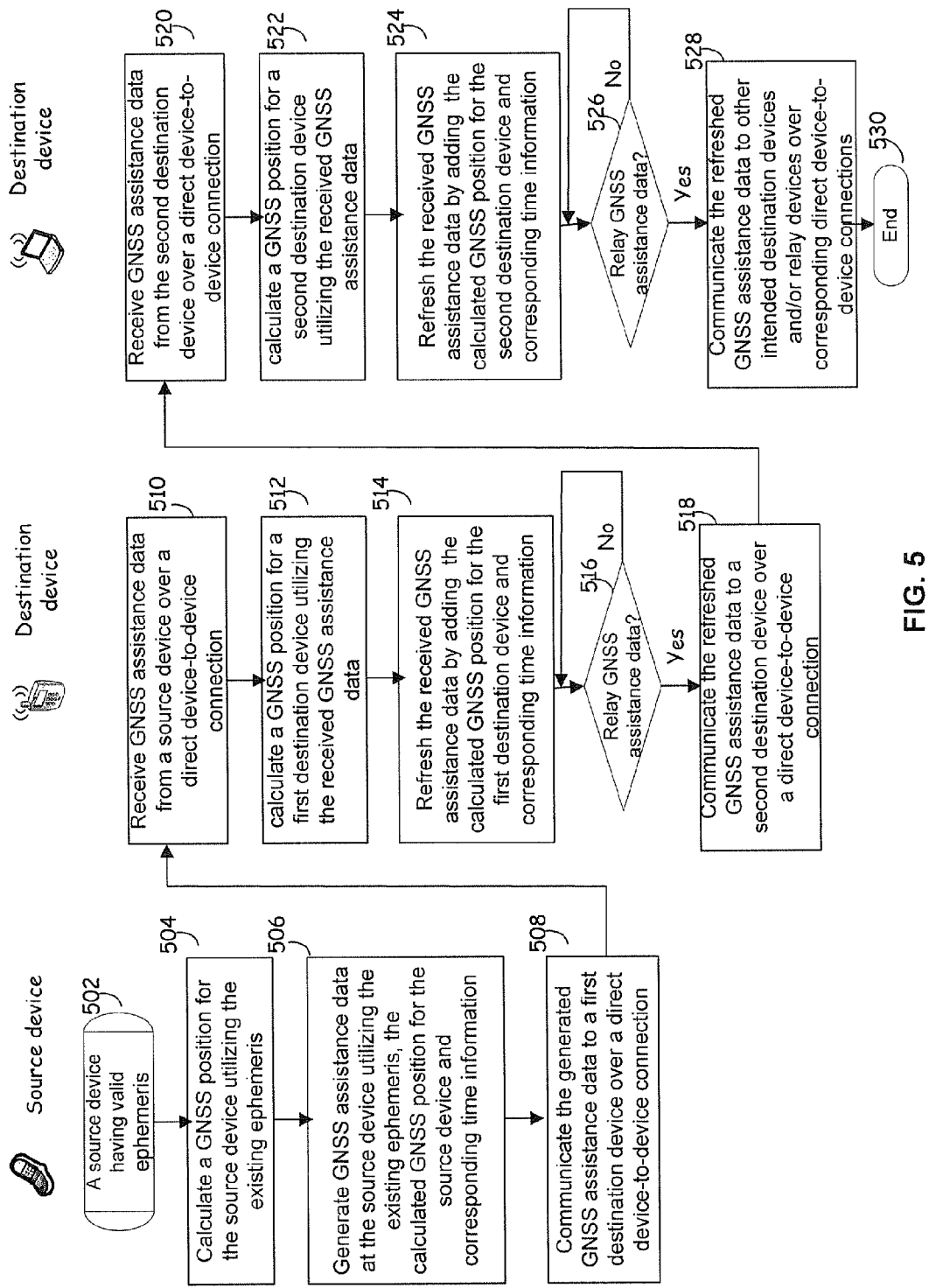
FIG. 5 is a flow chart illustrating exemplary steps for propagating GNSS assistance data from device to device in a GNSS spreading group, in accordance with an embodiment of the invention.

FIG. 5 is a flow chart illustrating exemplary steps for propagating GNSS assistance data from device to device in a GNSS group, in accordance with an embodiment of the invention. Referring to FIG. 5, the exemplary steps may start with step 502. In step 502, a source device such as the source device 121 and the source device 131 may already have ephemeris. The existing ephemeris may be created on the source device such as the source device 121, or may be acquired by the source device such as the source device 131 from other GNSS assistance data resources such as the location server 150. In step 504, a GNSS position may be calculated for the source device such as the source device 131 utilizing the existing ephemeris. In step 506, the source device 131 may be operable to generate GNSS assistance data at the source device 131 utilizing the existing ephemeris, the calculated GNSS position for the source device 131 and corresponding time information. In step 508, the source device 131 may be operable to communicate the generated GNSS assistance data to a first destination device such as the communication device 132 over a direct device-to-device connection. In step 510, the communication device 132, namely, the first destination device, may be operable to receive GNSS assistance data from the source device 131 over a direct device-to-device connection. In step 512, a GNSS position may be calculated for the communication device 132 utilizing the received GNSS assistance data. In step 514, the communication device 132 may be operable to refresh the received GNSS assistance data by adding the calculated GNSS position for the communication device 132 and corresponding time information. In step 516, it may be determined whether the communication device 132 acts as a relay device. In instances where the communication device 132 acts as a relay device, then in step 518, the communication device 132 may be operable to communicate the refreshed GNSS assistance data to a second destination device such as the communication device 133 over a direct device-to-device connection. In step 520, the communication device 133, namely, the second destination device, may be operable to receive GNSS assistance data from the communication device 132 over a direct device-to-device connection. In step 522, a GNSS position may be calculated for the communication device 133 utilizing the received GNSS assistance data. In step 524, the communication device 133 may be operable to refresh the received GNSS assistance data by adding the calculated GNSS position for the communication device 133 and corresponding time information. In step 526, it may be determined whether the communication device 133 acts as a relay device. In instances where the communication device 133 acts as a relay device, then in step 528, where the communication device 133 may be operable to communicate the refreshed GNSS assistance data to other intended destination devices and/or relay devices over corresponding direct device-to-device connections. The exemplary steps may end in step 530.

In step 516, in instances where the communication device 132 does not act as a relay device, the exemplary steps stay in step 516.

In step 526, in instances where the communication device 133 does not act as a relay device, the exemplary steps stay in step 526.

In various exemplary aspects of the method and system for propagating GNSS assistance data among communication devices in a GNSS group, a GNSS group such as the GNSS group 110 may comprise a plurality of communication devices such as, for example, an access point, a mobile device and/or a router. Device-to-device connections established directly between corresponding communication devices may be utilized in the GNSS group 110 to propagate or distribute GNSS assistance data from a communication device to one or more other communication devices within the GNSS group 110. The GNSS assistance data may comprise ephemeris received from one or more GNSS satellites such as the GNSS satellites 172-176 and/or predicted ephemeris. In instances where the communication device functions or acts as a source device such as the source device 111 and the source device 121, the predicted ephemeris may be generated or created by the communication device. In addition, the communication device may also be operable to acquire the ephemeris and/or predicted ephemeris from other resources such as a remote location server. In instances where the communication device acts as a destination device such as the communication device 112, the communication device 112 may be operable to receive the GNSS assistance data from a source device or other communication devices in the GNSS group 110. A GNSS position may be calculated for the communication device 112 utilized the GNSS assistance data. The GNSS assistance data may be refreshed by adding the calculated GNSS position for the communication device 112 and corresponding time information. In instances where the communication device 112 also acts as a relay device, the communication device 112 may be operable to communicate the refreshed GNSS assistance data to two or more other communication devices within the GNSS group 110 over corresponding direct device-to-device connections. In this regard, both wired and wireless direct device-to-device connections may be utilized for propagating the GNSS assistance data. Furthermore, depending on device capabilities, different communication technologies such as Bluetooth, Bluetooth low energy and/or WiFi may be applied to the corresponding direct device-to-device connections.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for propagating GNSS assistance data among communication devices in a GNSS group.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communication, the method comprising:
in a communication device that is within a Global Navigation Satellite Systems (GNSS) group that comprises a plurality of communication devices:
calculating a position for said communication device utilizing GNSS assistance data;
refreshing said GNSS assistance data by adding said position for said communication device and corresponding time information;
establishing a device-to-device connection from said communication device to one or more communication devices of said plurality of communication devices; and
propagating said refreshed GNSS assistance data from said communication device to said one or more communication devices utilizing said device-to-device connection.

2. The method according to claim 1, wherein said GNSS assistance data comprises ephemeris received from one or more GNSS satellites and/or predicted ephemeris.

3. The method according to claim 2, comprising generating said predicted ephemeris by said communication device.

4. The method according to claim 2, comprising acquiring said ephemeris and/or predicted ephemeris from a remote location server.

5. The method according to claim 2, comprising receiving said GNSS assistance data from another communication device of said plurality of communication devices.

6. The method according to claim 1, wherein said device-to-device connections comprise wired and/or wireless device-to-device connections between said communication device and said one or more communication devices of said plurality of communication devices.

7. The method according to claim 1, comprising utilizing two or more different communication technologies for said device-to-device connections.

8. The method according to claim 1, wherein said GNSS group comprises a GNSS spreading group.

9. A system for communication, the system comprising:
a processor and/or circuits for use in a communication device that is operable within a Global Navigation Satellite Systems (GNSS) group that comprises a plurality of communication devices, wherein said processor and/or circuits are configured to:
calculate a position for said communication device utilizing GNSS assistance data;
refresh said GNSS assistance data by adding said position for said communication device and corresponding time information;
establish a device-to-device connection from said communication device to one or more communication devices of said plurality of communication devices; and
propagate said GNSS assistance data from said communication device to said one or more communication devices utilizing said device-to-device connection.

10. The system according to claim 9, wherein said GNSS assistance data comprises ephemeris received from one or more GNSS satellites and/or predicted ephemeris.

11. The system according to claim 10, wherein said processor and/or circuits are configured to generate said predicted ephemeris by said communication device.

12. The system according to claim 10, wherein said processor and/or circuits are configured to acquire said ephemeris and/or predicted ephemeris from a remote location server.

13. The system according to claim 10, wherein said processor and/or circuits are configured to receive said GNSS assistance data from another communication device of said plurality of communication devices.

14. The system according to claim 9, wherein said device-to-device connection comprises a wired and/or wireless device-to-device connection between said communication device and said one or more communication devices of said plurality of communication devices.

15. The system according to claim 9, wherein said processor and/or circuits are configured to utilize two or more different communication technologies for said device-to-device connection.

16. The system according to claim 9, wherein said GNSS group comprises a GNSS spreading group.

17. A method, comprising:
- receiving assistance data at a relay communication device within a Global Navigation Satellite Systems (GNSS) spreading group;
- calculating a position for said relay communication device utilizing said assistance data at said relay communication device;
- refreshing said assistance data by adding said position for said relay communication device and corresponding time information at said relay communication device;
- establishing at least one device-to-device connection from said relay communication device to at least one other communication device within said GNSS spreading group; and
- propagating said refreshed assistance data from said relay communication device to said at least one other communication device utilizing said at least one device-to-device connection.

18. The method of claim 17, wherein said propagating further comprises propagating said refreshed assistance data to a subsequent relay communication device within said GNSS spreading group.

19. The method of claim 17, wherein said receiving farther comprises receiving said assistance data from a source communication device within said GNSS spreading group, said source communication device having received said assistance data from a remote location server.

20. The method of claim 17, wherein said receiving further comprises receiving said assistance data from a prior relay communication device within said GNSS spreading group, said prior relay communication device having refreshed said assistance data with its own calculated position and corresponding time information.

* * * * *